Sept. 30, 1969     K. E. HUMBERT, JR., ET AL     3,469,707

FILTER STRUCTURE

Filed Oct. 6, 1967

INVENTORS
Kingsley E. Humbert, Jr.
& James A. Rush
BY
Shoemaker and Mattare
ATTORNEYS United States Patent Office 3,469,707
Patented Sept. 30, 1969

3,469,707
FILTER STRUCTURE
Kingsley E. Humbert, Jr., and James A. Rush, Gastonia,
N.C., assignors to Wix Corporation, Gastonia, N.C.,
a corporation of North Carolina
Filed Oct. 6, 1967, Ser. No. 673,416
Int. Cl. B01d 27/08
U.S. Cl. 210—484                    1 Claim

ABSTRACT OF THE DISCLOSURE

A filter structure wherein the filter media is placed between a center tube and an outer casing with the tube and casing being of a relatively thick and heavy reticulated material, the cut ends of which produce sharp edges that damage the filter media. A clip receives and holds the cut ends serving a dual purpose to hold the tube and casing in the desired shape and to protect the filter media against the aforesaid damage.

---

The invention relates to a filter structure wherein a filter media of pleated paper is used with a center tube and an outer casing. The center tube and the outer casing are made of a relatively thick and heavy reticulated material, for example, expanded metal, which when cut to the length desired has sharp and ragged edges. These edges when placed on the filter media cut, tear or otherwise damage the media thereby making the filter structure undesirable and cause the structure to be rejected as not able to perform its desired function.

Therefore in order to overcome this objection this invention relates to a clip means into which the cut edges are placed and clamped therein thus holding the tube and casing in the desired shape and also preventing the cut edges from contacting the filter media and damaging the same.

Therefore, it is an object of this invention to provide a clip means to engage and hold the cut ends of the center tube and outer casing of the filter structure thus preventing damage to the fitler media.

With this object in mind, an embodiment of the invention is shown in the accompanying drawing which is a part of the application and in which.

Figure 1:
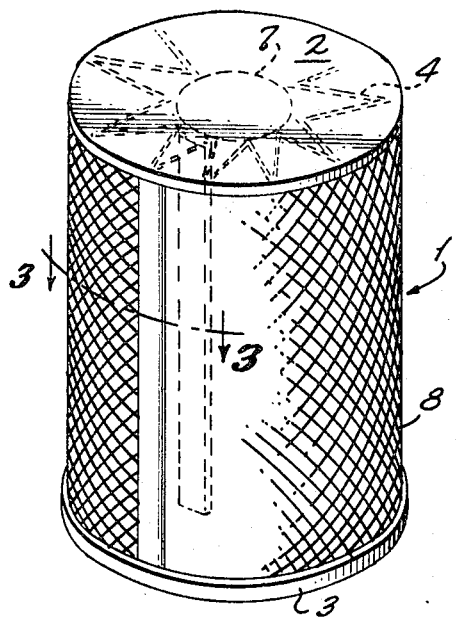
FIG. 1 is a perspective view of the filter structure with parts thereof in phantom.
Figure 2:
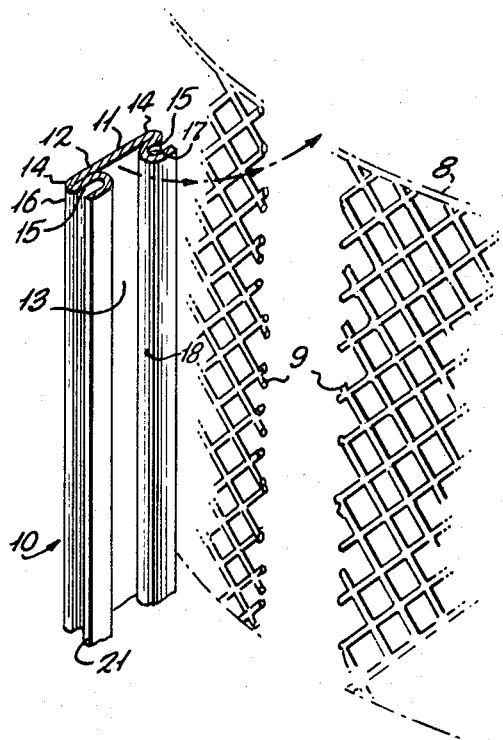
FIG. 2 is an exploded perspective view showing the relationship of the recticulated material and the clip means.
Figure 3:
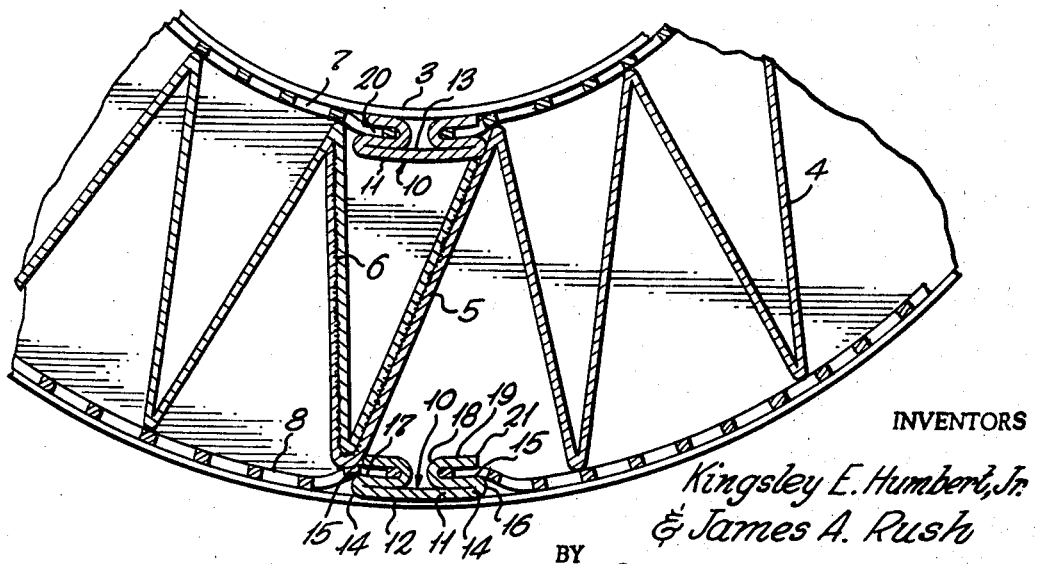
FIG. 3 is a partial cross-sectional view taken on line 3—3 of FIG. 1.

The filter structure is generally designated 1 having an upper end cap 2 and a lower end cap 3. Within the filter structure is a filter media 4 which is formed of pleated paper which may be formed into a tubular shape but which may assume any desired shape. The ends of the filter media are overlapped as at 5 and are joined together by a glue 6. Other means may be used for joining the ends of the filter media together such as staples, clips, etc.

Within the filter structure is an inner tube 7 and surrounding the filter media is an outer casing 8. The inner tube and the outer casing are made of a relatively thick and heavy reticulated material such as expanded metal. Other material having perforations or openings therein may be used. The material used for the inner tube and outer casing is cut from an endless strip of the material in desired lengths to form the inner tube and outer casing. Such cutting of the material produces ragged edges 9.

These ragged edges are sharp and when used heretofore without a protective means these ragged edges cut, tear or otherwise damage the filter media so that its usefulness is impaired. This usually happens in the assemblying operation of placing the inner tube within the filter media and outer casing around the outer portion of the filter media.

To overcome this objection and to protect the filter media, applicants have provided a clip means indicated generally at 10. Inasmuch as the inner tube and the outer casing are formed of the same material and the same clip means is used to engage and hold the ragged cut edges, there is described hereinafter the structure of the clip means and its function and it is undesrtood that such description will apply to both the inner tube and outer casing and the clip means provided in each instance. The clip means has a base portion 11 which is of the same length as the metal structures and which is of a sufficient width to provide recesses to receive the ragged edges. The base portion has an outer wall 12 and an inner wall 13. Extending from each longitudinal side 14 of the base portion 11 are end portions 15. The end portions are reverse bent as at 16 so that the inner walls of the base portion 11 and the end portions 15 substantially contact throughout a portion of their length or surface. This part of the end portion 15 which lies adjacent the inner wall of the base portion 11 forms the inner leg of a U 17. The further part of the end potrion 15 is reversely bent in a direction opposite to the reverse bend 16 as shown at 18 to provide the second leg of the U 19. The second reverse bend 18 is not as sharp a bend as the first reverse bend 16 and provides the base of the U. The second leg 19 of the U is spaced from the first leg 17 to provide an opening 20 forming a pocket for the reception of the cut ragged edges 9 of the reticulated material.

After the cut ragged edges 9 are inserted in the pockets or recesses 20 of the U-shaped portion of the clip means, the clip means may be engaged by any type of tool to force the free end edge 21 of the leg 19 downwardly upon the reticulated material to hold the cut ragged ends of that material within the clip means.

Although we have described the recticulated material as being of heavy expanded metal, it could be formed of other reticulated material and could also be formed of perforated metal or other material which when cut in the lengths desired for forming the particular structures will have ragged sharp edges.

The clip means may be formed of metal, plastic or other material which possesses the necessary strength to hold the reticulated material in the shape in which it is bent or placed thus preventing the cut edges of the reticulated or other material from damaging the filter media.

While there has been described a specific embodiment of this invention this is considered by way of example only and is not to be used in any way to limit the scope of the claim hereunto appended.

We claim:

1. A filter structure comprising a filter media, end caps on each end thereof, an inner tube of heavy reticulated metal within the filter media, an outer-casing of heavy reticulated metal surrounding the filter media, each of the recticulated pieces having ragged and sharp edges when cut to the desired size, a double U-shaped clamp engaging the cut ends and holding the metal in the shaped pieces, the clamp being co-extensive with the cut ends, the clamp comprising one piece of material having a base portion, each end portion being reversely bent with respect to the base portion and lying adjacent the base portion and adjacent the longitudinal side thereof, the remainder of each end portion being reversely bent with respect to the first reversely bent portion and being spaced therefrom and parallel thereto and being provided with free ends, thus forming oppositely extending longitudinal openings, cut edges being inserted into the longitudinal openings with the free ends being forced into engagement with the surface of the metal pieces adjacent the cut edges to hold the cut edges in position and preventing the cut edges from engaging the filter media and injuring the same.

References Cited

UNITED STATES PATENTS

| | | | |
|---|---|---|---|
| 2,797,811 | 7/1957 | Wilkinson | 210—484 X |
| 2,988,227 | 6/1961 | Harms | 210—493 |
| 3,216,578 | 11/1965 | Wright et al. | 210—484 |
| 3,353,457 | 11/1967 | Whittingham et al. | 210—484 X |
| 3,406,832 | 10/1968 | Ruschman et al. | 210—493 X |

FOREIGN PATENTS

| | | |
|---|---|---|
| 537,143 | 2/1957 | Canada. |
| 578,829 | 7/1946 | Great Britain. |

REUBEN FRIEDMAN, Primary Examiner

JOHN W. ADEE, Assistant Examiner

U.S. Cl. X.R.

210—493, 499